Dec. 16, 1952  L. V. BLACK  2,621,397
PORE HOLE SEAL FOR DOUBLE WINDOWS
Filed Jan. 27, 1949

Inventor
LLOYD V. BLACK
By Olen E. Bee
Attorney

Patented Dec. 16, 1952

2,621,397

UNITED STATES PATENT OFFICE 2,621,397

PORE HOLE SEAL FOR DOUBLE WINDOWS

Lloyd V. Black, Tarentum, Pa., assignor to Pittsburgh Plate Glass Company, Allegheny County, Pa., a corporation of Pennsylvania Application January 27, 1949, Serial No. 73,181

1 Claim. (Cl. 29—148)

The present invention relates to the vent employed to equalize the pressure and to admit of purging of double glazed windows and it has particular relation to the sealing of the small vent or pore hole in double glazed units where plates of glass are welded together, for example, by the method disclosed in Gray Patent 2,398,527 or Guyer et al. Patent 2,389,360.

One object of the invention is to provide a pore hole seal for double glazed units of the foregoing type which will provide a highly effective barrier against the permeation of moisture into double glazed units.

A second object of the invention is to provide a pore hole seal which will withstand wide variations of temperature without impairment of the seal.

A third object of the invention is to provide a pore hole seal for double glazed units which will withstand long periods of service without impairment.

A fourth object of the invention is to provide a pore hole seal for double glazed units which is inexpensive to apply.

These and other objects of the invention will be apparent from consideration of the following specification and the appended claim.

For a better understanding of the invention, reference may be had to the accompanying drawings in which like numerals refer to like parts throughout and in which Figure 1 is a sectional view taken upon line I—I of Figure 2, of a double glazed unit embodying the principles of the invention.

Figure 1:
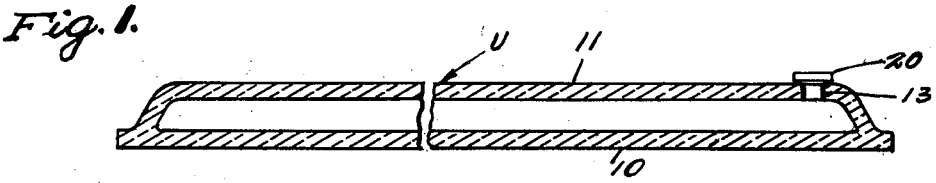

It has heretofore been proposed to provide double glazed units embodying spaced parallel plates or sheets of glass which are appropriately sealed together about their margins in order to exclude the ingress of moisture, dirt and the like objectionable materials. One form of unit, as heretofore prepared, has embodied spacer strips of rubber or plastic which might or might not be bonded to the glass. This type of construction has not proved very satisfactory for many uses because few, if any, plastics are satisfactorily resistant to the permeation of moisture and also because of the difficulty of obtaining a complete and permanent bond of the plastic material to the glass. Within relatively short periods of time after the completion of the units moisture inevitably found its way into the units and was likely, in cold weather, to produce dew or haze inside of the unit which was highly objectionable.

It has also been proposed to provide double glazed units embodying sheets of glass the edges of which were appropriately bent and welded together to provide an all-glass construction which would exclude the entrance of moisture except possibly such as might, over a very long period of time, actually permeate through the glass itself. The construction of all-glass welded units of this type is described in such patents as the Gray and Guyer patents above referred to. In this type of construction the plates or sheets of glass embodied in the units are brought together in spaced relation in a highly heated furnace and the edges of one sheet are appropriately heated in order to soften them and blend them into contact with the other sheet and also to effect a weld of the margins of the first sheet to the portions of the second sheet with which contact is established.

It will be obvious that in the construction of such welded units, the air within the unit at the time of the weld is highly heated and therefore expanded to a very substantial degree. Unless an opening is established in the unit the pressure upon the units becomes quite substantial as the glass cools down and would probably cause destruction of the unit if it were not relieved by appropriate technique. The common method of permitting the pressure within the unit to reestablish itself as the unit cools down involves the provision of minute holes or openings termed pore holes which usually are drilled in a portion of one of the plates where in the finished unit the opening will be comparatively inconspicuous. For example, a pore hole may be formed near a corner or a margin where the closure element will be covered over with putty in the normal glazing operations to which the units are subjected. Of course, this location of the pore hole is primarily selected for purposes of appearance and if this is not a particular element, the pore hole may be located anywhere in the construction.

In a unit embodying a pore hole of the foregoing type, the air pressure adjusts itself by inflow of air as the gases inside the units cool and shrink. After the units have cooled to normal temperature, it is necessary to provide a seal for the pore hole in order to exclude dirt and moisture. This sealing of the pore hole has constituted a very serious problem. Usually, it is preferred to effect sealing at a moderate temperature in order to assure that the gases within the unit will not be excessively expanded and will, therefore shrink to produce an excessive degree of vacuum as the unit cools. Also it is essential that local stresses on the glass about the pore hole be avoided in order to prevent checking or cracking the glass as a result of thermal stresses. Numerous schemes have been proposed for sealing the pore holes some of which are more or less satisfactory but from a standpoint of economy leave something to be desired.

The present invention contemplates the provision of a seal for pore holes of double glazed units in which glass about the opening or pore hole is subjected to mirroring with platinum or preferably a mixture of platinum, gold and rhodium by appropriate technique and a closure element of lead is then soldered to the mirrored surface. The metallic mirror provides an excellent bond to which the solder can unite permanently and efficiently. The solder, in turn, provides a satisfactory seal or bond to the lead constituting the plug.

A double glazed unit U embodying the principles of the invention is illustrated in section in Figure 1. It comprises a lower plate of glass 10 and upper plate 11. The margins of the latter plate are dropped or bent downwardly as indicated at 12 to provide edge walls. The margins of these edge walls are welded to the upper face of the plate 10 near the outer perimeter thereof. The technique of effecting this type of weld is discussed in greater detail in the foregoing patents to Gray and Guyer et al. Detailed discussion herein is not deemed to be necessary.

Figure 2:
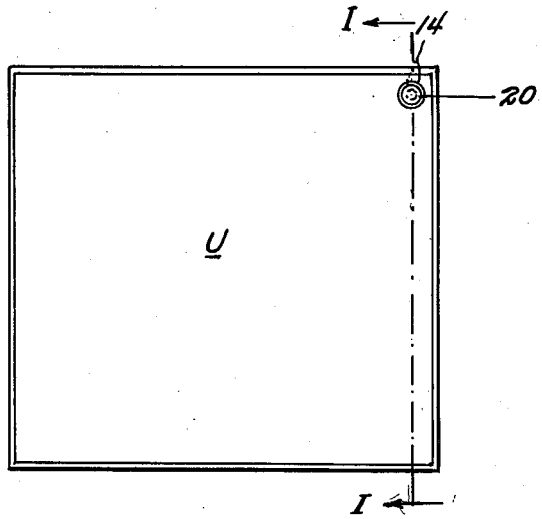
Figure 2 is a plan view of the construction illustrated in Figure 1.
Figure 3:
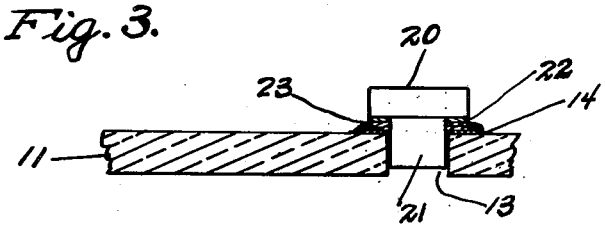
Figure 3 is a fragmentary sectional view through a pore hole and seal in a unit constructed as illustrated in Figure 1.
Figure 4:
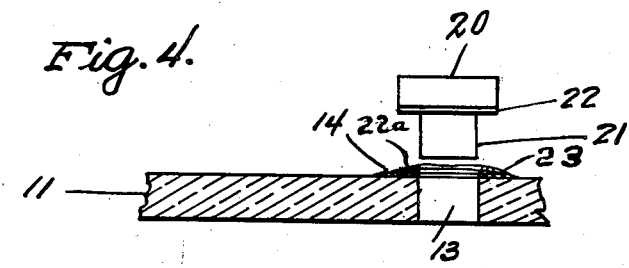
Figure 4 is a fragmentary sectional view illustrating the pore hole and sealing element just prior to the insertion of the latter.

It is to be understood that prior to forming these units one of the plates, e. g. the plate 11 is provided with one or more pore openings 13 which, as shown in Figures 1 and 2, is disposed near the margin or at a corner of the sheet. These holes may be drilled by means of appropriate tools such as a diamond drill or a drill of a hard alloy adapted for drilling glass. Preferably the openings will be of comparatively small diameter, e. g. about $\frac{1}{16}$ of an inch or thereabouts. The precise dimensions are not a feature of the present invention.

In order to provide a glass surface that will be adherent to solder, the area about the opening 13 is first provided with the mirror 14 of platinum or platinum alloy. The first step in mirroring involves cleaning the glass quite thoroughly. This could be done by scrubbing the glass, but preferably it is performed with a cleaning solution such as is employed to clean glassware in chemical laboratories. A solution of a strong oxidizing agent is preferred as a cleaning agent. Chromic chloride in water is quite satisfactory. Subsequently the cleaned surface is treated with a platinum compound or preferably a mixture of a platinum compound and a compound of rhodium and/or gold. These latter improve the properties of mirror, but are not absolutely necessary. The compound or compounds in an appropriate solvent, may be applied by sponging, brushing or spraying.

One convenient embodiment of the platinum compound is sold commercially by the Hanovia Chemical Company of Newark, New Jersey, under the trade name of "Platinum Bright." The composition of this material is approximately as follows:

Platinum, 50 to 70%, e. g. 60%
Gold, 30 to 50%, e. g. 40%
Rhodium, .03 to .2%, e. g. .05 to .115%

Gold and rhodium could be omitted but preferably are included.

These metals are made up as resinates, e. g. as the abietates and are dissolved in any convenient non-reactive solvent such as oil of lavender to render them fluid.

The application of a reducing agent designed to precipitate the metals from the solutions is also desirable. Appropriate reducing agents are well known to the art and may, for example, include phenyl hydrazine, hydrogen, carbon monoxide, tartaric acid, citric acid or any other convenient reducing agent. Liquid reducing agents or soluble reducing agents can be included in the "Platinum Bright" solution. However, if desired, the reducing agent can be sprayed upon or otherwise applied to the glass after the "Platinum Bright" solution has been applied. For example, phenyl hydrazine could be sprayed against the glass heated to a temperature of about 400 to 800 or 900° F. The application of "Platinum Bright" to glass to provide a mirror is well understood and it is not deemed necessary to describe in detail such operation.

A convenient mode of mirroring involves applying "Platinum Bright" solution about a pore hole 13 as described. In order to reduce the solution and fuse the metal to the glass, the plates may conveniently be heated as in preheating to relieve the strains in the glass. This is a necessary operation in forming welded double glazed units. A temperature of 800 or 900° F. is probably reached, which is adequate to lay down a mirror of platinum or platinum, gold and rhodium. The plates of glass carrying the mirror are formed into double glazed units by such techniques as are described in the patents to Gray or Guyer et al. already referred to or by refinements of such methods. In this operation the glass about the pore holes, if the latter are within an inch or two of the edges or corners of the glass, probably reach a temperature of 1200 to 1400° F. which is sufficient thoroughly to fuse or bond the metals in the film to the glass.

The welded units having the surfaces about the pore holes properly mirrored with platinum or with a mixture of platinum, gold and rhodium is annealed and cooled and is ready for the final sealing operation.

The sealing element for closing the opening in the glass may conveniently comprise a plate or disc of lead which may or may not embody a plug like portion 21 adapted to fit into the pore opening in order to assist in mechanically anchoring the seal in position. The lower face of the disc 20 preferably is coated with a layer 22 of solder of low fusing point, that is, of a fusing point that will permit its application to the lead plug without actually fusing the latter. A bismuth lead solder is convenient for the purpose. One such would include lead, 40 to 60%, e. g. 54%; tin, 20 to 40%, e. g. 23%; bismuth, 10 to 30%, e. g. 17%; antimony, .05 to 5%, e. g. 1%.

To the mirrored surface is applied a solder 22a, e. g. a lead-tin solder comprising 30 to 50 or about 40% tin, and 50 to 70% or about 60% of lead. The solder may be applied thereupon, for example, by application of a heated soldering iron. In some instances, the application of the solder is promoted by cleaning and protecting the mirrored surface or by the application of a mild flux such as a mixture of 5% ammonium chloride and 95% of glycerine and enough water to dissolve the ammonium chloride.

It is also desirable to apply to the mirror a layer 23 of a low temperature fusing bismuth solder such as one of those above referred to or any other solder having fusing points sufficiently low to admit of its being fused without fusing the lead plug.

After the surfaces of the body 20 and of the platinum mirror have been properly coated with solder, the unit U may be purged with a dehydrated gas such as air introduced through opening 13. The body portion 21 of the sealing element may be inserted in the opening 13 so that the soldered surfaces of the plug contact with the corresponding surfaces upon the mirror. The parts may then be bonded together by application of a warm soldering iron to the disc 20 for sufficient length of time to fuse the layers 22 and 23 of the bismuth solder into a single layer. When this operation is completed the sealing of the unit is perfected.

It will be apparent to those skilled in the art that the embodiments of the invention herein described are by way of illustration. Numerous modifications may be made therein without departure from the spirit of the invention or the scope of the appended claim.

I claim:

The method of forming a low temperature seal for a pore hole adjacent the marginal edge of one glass sheet of a double glazing unit whose marginal edges are fused together, comprising the steps of coating the glass about the pore hole with a platinum salt suspended in a suitable medium, assembling the glass sheets to form the double glazing unit and heating the marginal edges of the glass to fusion temperature to bond them together and to bond a film of platinum upon the glass about the pore hole, cooling the unit to room temperature, coating the platinum film with an adhering coating of lead-tin solder, then applying a coating of low fusing alloy of bismuth and lead to the lead-tin solder coating, placing over the pore hole a closure of lead having a coating of low fusing alloy of bismuth and lead thereon, then heating the lead closure to fuse together the solder on the lead closure and the platinum film.

LLOYD V. BLACK.

REFERENCES CITED

The following references are of record in the file of this patent:

UNITED STATES PATENTS

| Number | Name | Date |
| --- | --- | --- |
| 2,053,765 | Dana | Sept. 8, 1936 |
| 2,075,477 | Smith | Mar. 30, 1937 |
| 2,235,681 | Haven | Mar. 18, 1941 |
| 2,359,163 | Sherts | Sept. 26, 1944 |
| 2,365,518 | Berkey et al. | Dec. 19, 1944 |
| 2,402,661 | Ohl | June 25, 1946 |
| 2,462,020 | Craig | Feb. 15, 1949 |

OTHER REFERENCES

Mag. Prod. Eng., December 1947, pp. 154–157. (Copy in Div. 14.)